US011431408B2

(12) United States Patent
Roux et al.

(10) Patent No.: US 11,431,408 B2
(45) Date of Patent: Aug. 30, 2022

(54) HIGH SPEED BIDIRECTIONAL OPTICAL TIME-DOMAIN REFLECTOMETER (OTDR)-BASED TESTING OF DEVICE UNDER TEST

(71) Applicant: VIAVI SOLUTIONS INC., San Jose, CA (US)

(72) Inventors: Charlène Roux, Chamboeuf (FR); Julien Barrier, Saint Jean Bonnefonds (FR)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

(21) Appl. No.: 17/157,636

(22) Filed: Jan. 25, 2021

(65) Prior Publication Data

US 2022/0140894 A1 May 5, 2022

(30) Foreign Application Priority Data

Nov. 4, 2020 (EP) .................................... 20306322

(51) Int. Cl.
*H04B 10/071* (2013.01)
*H04B 10/66* (2013.01)
*H04B 10/50* (2013.01)
*H04B 10/25* (2013.01)
*H04B 10/40* (2013.01)

(52) U.S. Cl.
CPC ........... *H04B 10/071* (2013.01); *H04B 10/25* (2013.01); *H04B 10/50* (2013.01); *H04B 10/66* (2013.01); *H04B 10/40* (2013.01)

(58) Field of Classification Search
None
See application file for complete search history.

(56) References Cited

U.S. PATENT DOCUMENTS

| 4,823,166 A | 4/1989 | Harlog |
| 5,144,125 A | 9/1992 | Carter |
| 5,534,994 A | 7/1996 | Hanson |
| 6,369,883 B1 | 4/2002 | Clark |
| 6,445,445 B1 | 9/2002 | Nakayama |
| 6,456,685 B1 | 9/2002 | LaGasse |

(Continued)

FOREIGN PATENT DOCUMENTS

| EP | 2755008 | 7/2014 |
| WO | WO-2012/129453 | 9/2012 |
| WO | 2019/235152 | 12/2019 |

OTHER PUBLICATIONS

Lee, "A Practical In-Service Supervisory Technique Using Reflected-Pulse Detection Based on OTDR for Optically Amplified Passive Branched CATV Networks" IEEE Photonics Technology Letters, vol. 11, No. 5, May 1999, pp. 611-613 (Year: 1999).*

*Primary Examiner* — Darren E Wolf
(74) *Attorney, Agent, or Firm* — Mannava & Kang, P.C.

(57) ABSTRACT

In some examples, high speed bidirectional OTDR-based testing may include transmitting data from a first end of a device under test (DUT) towards an optical time-domain reflectometer (OTDR) that is operatively connected to a second opposite end of the DUT. Further data that is transmitted by the OTDR may be received from the second opposite end of the DUT towards the first end of the DUT. Based on an amplitude of the further data, a direction of receiving of the further data may be adjusted towards a first receiver or towards a second receiver.

9 Claims, 14 Drawing Sheets

(56) References Cited

U.S. PATENT DOCUMENTS

| | | |
|---|---|---|
| 6,781,678 B2 | 8/2004 | Aoki |
| 7,256,878 B1 | 8/2007 | Asher |
| 8,222,906 B2 | 7/2012 | Wyar |
| 8,576,389 B2 | 11/2013 | Perron et al. |
| 9,140,624 B2 | 9/2015 | Bao |
| 9,170,173 B2 | 10/2015 | Perron et al. |
| 9,240,836 B1 | 1/2016 | Chen |
| 9,341,543 B2 | 5/2016 | Viswanathan |
| 9,825,700 B2 | 11/2017 | Ruchet |
| 10,101,240 B1 | 10/2018 | Bonche |
| 10,274,398 B2 | 4/2019 | Na |
| 2004/0047629 A1 | 3/2004 | Evangelides |
| 2004/0218171 A1* | 11/2004 | Peerlings ............ G01M 11/3109 356/73.1 |
| 2006/0244949 A1 | 11/2006 | Chen et al. |
| 2007/0091297 A1* | 4/2007 | Beller ................ G01M 11/3109 356/73.1 |
| 2008/0225377 A1* | 9/2008 | Beller .................. H04B 10/071 359/315 |
| 2012/0045205 A1 | 2/2012 | Perron |
| 2013/0155391 A1 | 6/2013 | Achten |
| 2014/0009763 A1* | 1/2014 | Bao .................... G01M 11/3118 356/447 |
| 2014/0140691 A1 | 5/2014 | Reaves |
| 2014/0198311 A1 | 7/2014 | L'Heureux |
| 2016/0337034 A1* | 11/2016 | Ruchet .............. H04B 10/2581 |
| 2017/0294959 A1 | 10/2017 | Archambault |
| 2018/0266808 A1 | 9/2018 | Shaar |
| 2018/0313719 A1* | 11/2018 | Bonche ................ H04B 10/071 |
| 2018/0372581 A1 | 12/2018 | Bonche |
| 2020/0041360 A1* | 2/2020 | Champavere ...... G01D 5/35361 |
| 2020/0072703 A1 | 3/2020 | Roux et al. |
| 2020/0292416 A1 | 9/2020 | Gagnon et al. |
| 2020/0326261 A1* | 10/2020 | Champavere ...... G01M 11/3136 |

* cited by examiner

| | O->E | E->O | Sum | Average | Actual Loss |
|---|---|---|---|---|---|
| | | | OTDR | | |
| Splice A | -0.02 | 0.08 | 0.06 | 0.03 | 0.03 |
| Splice B | 0.12 | 0.02 | 0.14 | 0.07 | 0.07 |

```
TRANSMIT DATA FROM A FIRST END OF A DEVICE UNDER TEST (DUT)
TOWARDS AN OPTICAL TIME-DOMAIN REFLECTOMETER (OTDR) THAT IS
OPERATIVELY CONNECTED TO A SECOND OPPOSITE END OF THE DUT
1002
```

```
RECEIVE FURTHER DATA THAT IS TRANSMITTED BY THE OTDR FROM
THE SECOND OPPOSITE END OF THE DUT TOWARDS THE FIRST END OF
THE DUT
1004
```

```
SWITCH, BY AN OPTICAL SWITCH, BASED ON THE RECEIVED FURTHER
DATA, BETWEEN AN INPUT/OUTPUT AND A BIDIRECTIONAL OPTICAL
SUB-ASSEMBLIES (BOSA)-BASED DATA RECEIVER ASSOCIATED WITH
THE DATA RECEIVER
1006
```

*FIG. 10*

HIGH SPEED BIDIRECTIONAL OPTICAL TIME-DOMAIN REFLECTOMETER (OTDR)-BASED TESTING OF DEVICE UNDER TEST

PRIORITY

The present application claims priority under 35 U.S.C. 119(a)-(d) to European patent application number 20306322.7, having a filing date of Nov. 4, 2020, the disclosure of which is hereby incorporated by reference in its entirety.

BACKGROUND

A fiber optic cable may include one or more optical fibers that may be used to transmit light from a source to a destination. The optical fibers of the fiber optic cable may be referred to as fiber optic links. Fiber optic cables may represent a network element of a fiber optic network. In this regard, other types of network elements may include optical connectors, optical splices, optical couplers, and optical switches. A fiber optic network may be monitored, for example, by a remote fiber monitoring system that enables oversight of an entire fiber optic network from a central location.

BRIEF DESCRIPTION OF DRAWINGS

Features of the present disclosure are illustrated by way of example and not limited in the following figure(s), in which like numerals indicate like elements, in which:

FIG. 4 illustrates half-sum of the insertion losses obtained on both sides to remove the influence of relative Rayleigh backscattering coefficients, in accordance with an example of the present disclosure;

FIG. 10 illustrates a flowchart of an example method for high speed bidirectional OTDR-based testing in accordance with an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

High speed bidirectional Optical Time Domain Reflectometer (OTDR)-based testing apparatuses, methods for high speed bidirectional OTDR-based testing, and non-transitory computer readable media for high speed bidirectional OTDR-based testing are disclosed herein. The apparatuses, methods, and non-transitory computer readable media disclosed herein provide for relatively high test speeds, for example, for data transfers such as transfer of OTDR measurement point files, within a relatively short time duration. In this regard, the apparatuses, methods, and non-transitory computer readable media disclosed herein provide for high-performance communication based on the implementation of hardware and software functionality that is dedicated to the transfer of data.

With respect to the apparatuses, methods, and non-transitory computer readable media disclosed herein, an OTDR may utilize Rayleigh backscattering and Fresnel reflection signals to monitor events with respect to a fiber optic network. One of the unique advantages of OTDR testing is that it utilizes access to one end of a fiber optic cable that may include a plurality of fiber optic links. Since distance and attenuation measurements are based on Rayleigh optical backscattering and the Fresnel reflection principle, returned light may be analyzed directly from the one end of a fiber optic link of the fiber optic cable.

In order to minimize the impact of errors and uncertainties that can accompany one-way testing of a fiber optic link, two-way reflectometry test methods may be utilized to improve the precision and accuracy of testing of a fiber optic link. The two-way reflectometry test methods may be denoted as bidirectional reflectometry testing. For bidirectional reflectometry testing, a fiber optic link may be characterized by measuring attenuation and loss from both ends of the fiber optic link.

Figure 2A:
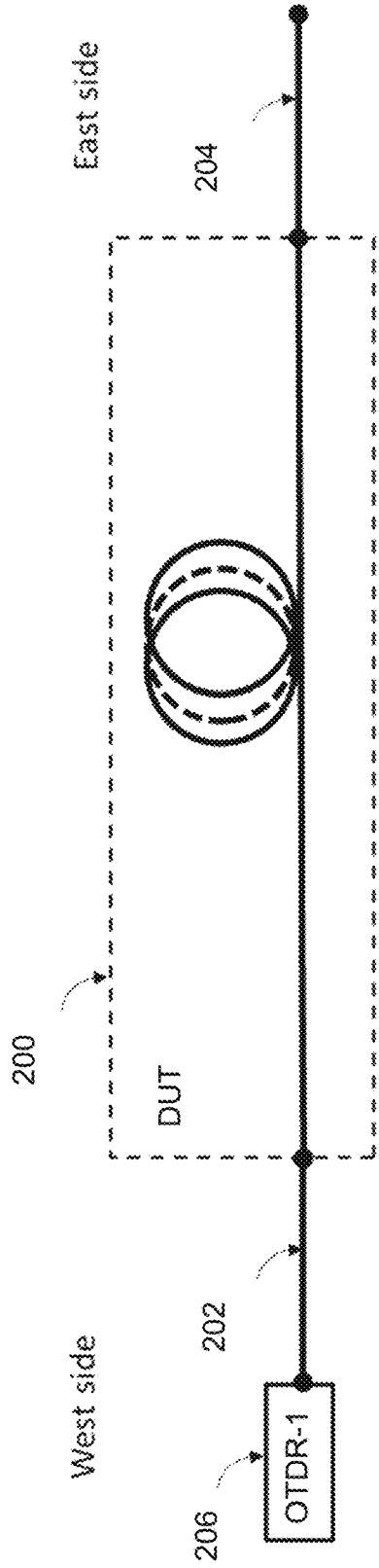
FIGS. 2A and 2B illustrate testing of a fiber optic link (e.g., a device under test (DUT)) in both directions by an OTDR.
Figure 2B:
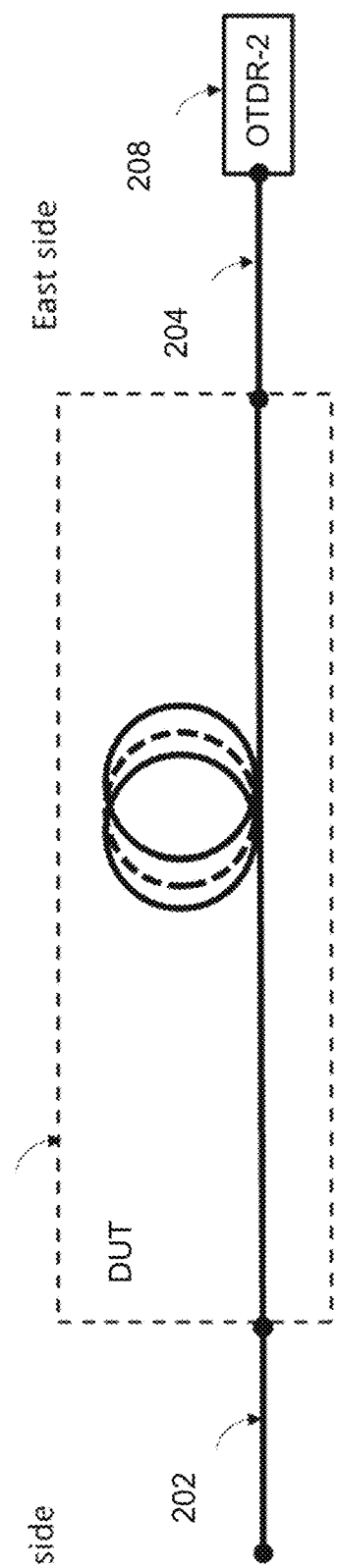

For example, FIGS. 2A and 2B illustrate testing of a fiber optic link (e.g., a device under test (DUT) as disclosed herein) in both directions by an OTDR, in accordance with an example of the present disclosure.

Referring to FIG. 2A, in order to perform bidirectional testing of a fiber optic link 200, the fiber optic link 200 may be operatively connected to a launch fiber 202 and a receive fiber 204 at opposite ends thereof. For example, the launch fiber 202 may be operatively connected to port of OTDR-1 at 206, and to a DUT that may include the fiber optic link 200. The launch fiber 202 may be used to interface the OTDR-1 with the fiber optic link 200 in order to limit the risk of damage to the optical connector of the OTDR-1 by reducing the number of optical connections and disconnections. The launch and receive fibers may also provide for full characterization of the end connections of the fiber optic link 200.

The launch and receive fibers may create a symmetrical configuration at both ends of the fiber optic link 200. In bidirectional OTDR testing, the same fiber optic link 200 may be tested in both directions using one or two OTDRs (e.g., OTDR-1 at 206 of FIG. 2A, and OTDR-2 at 208 of FIG. 2B). The average of the results obtained in both directions may then be determined.

Compared to unidirectional testing of a fiber optic link, bidirectional fiber optic link testing may provide higher accuracy results with respect to characterization of the fiber optic link. Since Rayleigh backscatter is used to quantify the fiber optic link attenuation and insertion loss of each event, the fiber optic link backscatter coefficient may need to be known and programmed into the OTDR. This coefficient can vary between different fiber optic links, and the OTDR may display excessive attenuation or even negative attenuation (e.g., gain) at the junctions between fiber optic links with different coefficients. The actual value of the fiber optic link attenuation and of each event during the presence of fibers with different coefficients on the same fiber optic link may be determined by averaging the results obtained with a bidirectional OTDR test.

If a fiber optic link with a lower backscatter coefficient has been soldered to a fiber optic link with a higher backscatter coefficient, the splice attenuation measured by the OTDR may be negative (e.g., therefore false). This effect may be designated as a "gain" because the amount of backscatter observed may be higher after the event than before. Conversely, if a fiber optic link with a higher backscatter coefficient has been soldered to a fiber optic link with a lower backscatter coefficient, the splice attenuation measured by the OTDR may be greater than the actual attenuation of that splice. By averaging the values obtained from the two ends of the fiber optic link, the actual value of the attenuation of a splice or connection may be obtained.

Figure 3A:
FIG. 3A illustrates a principle of reducing insertion loss measurement errors related to a difference in Rayleigh backscattering coefficients between fiber optic links, and FIGS. 3B and 3C respectively illustrate a combination of the curves or the measurement results of the measurements carried out in both directions, in accordance with an example of the present disclosure.
Figure 3B:
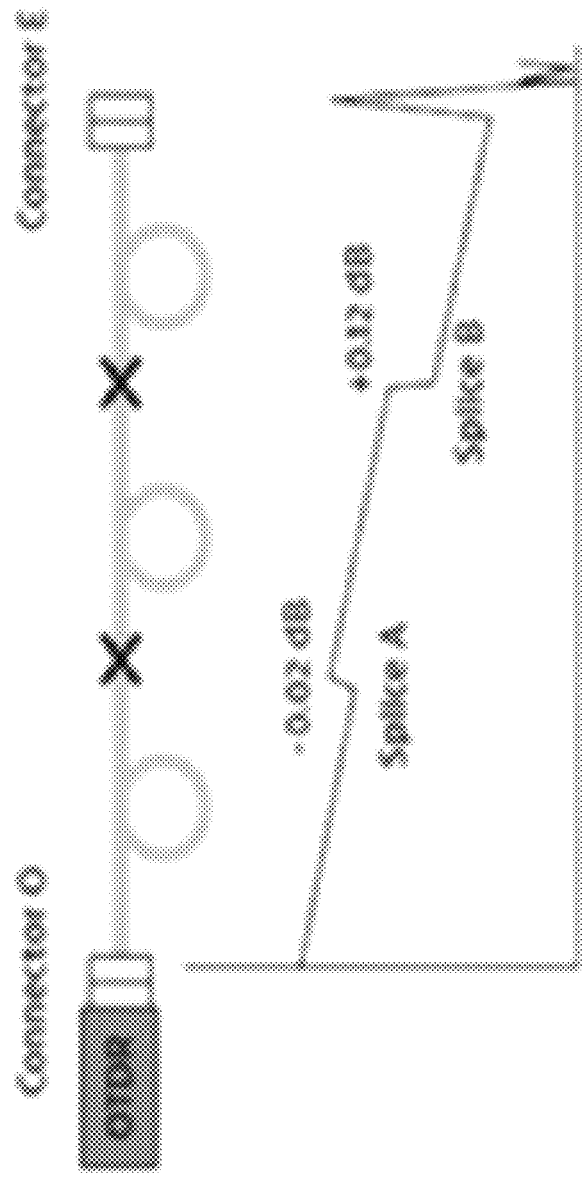

FIGS. 3A-3B illustrate a principle of reducing insertion loss measurement errors related to a difference in Rayleigh backscattering coefficients between fiber optic links, and a combination of the curves or the measurement results of the measurements carried out in both directions, in accordance with an example of the present disclosure.

Figure 3C:
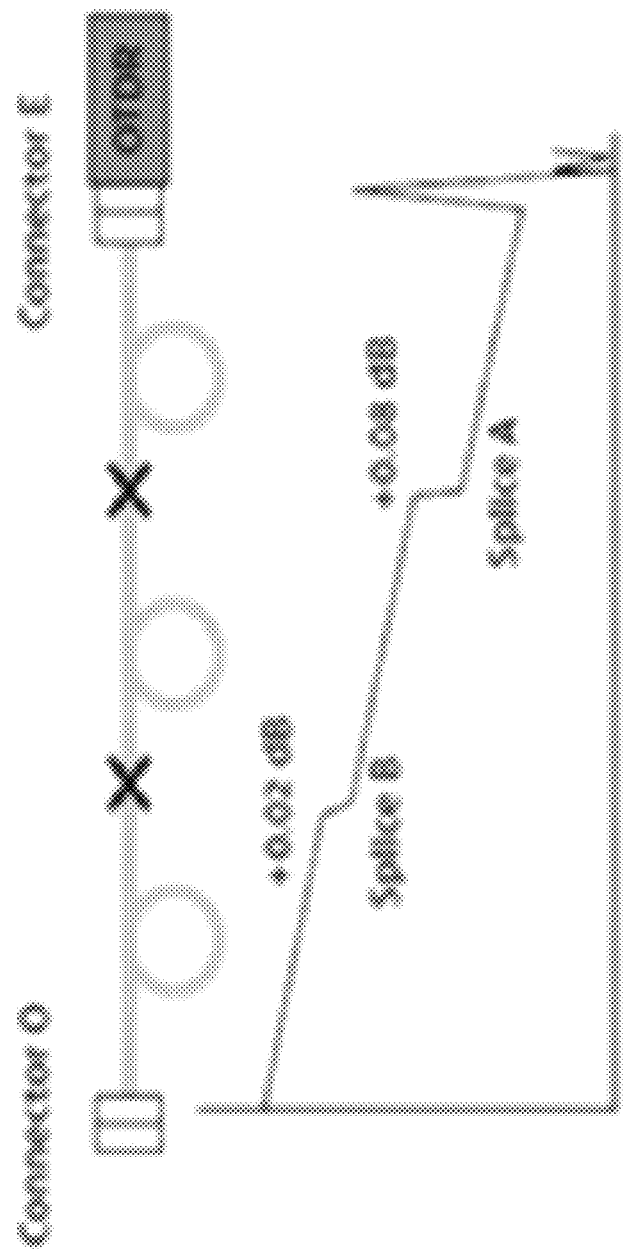

Specifically, FIG. 3A shows the principle of reducing insertion loss measurement errors related to the difference in Rayleigh backscattering coefficients between fiber optic link-2 (e.g., Fiber-2), and fiber optic link-1 and fiber optic link-3 (e.g., Fiber-1 and Fiber 3). In this regard, Fiber-1, Fiber-2, and Fiber-3, may be respectively connected at Splice-A and Splice-B, with a 0.05 dB apparent loss/gain at the junctions of the splices. FIGS. 3B and 3C respectively illustrate the combination of curves or measurement results of the measurements performed in both directions. In this regard, FIGS. 3B and 3C provide for the apparent loss values to be obtained. In this regard, the half-sum of the insertion losses may be obtained on both sides of the fiber optic link to remove the influence of the relative Rayleigh backscattering coefficients.

FIG. 4 illustrates half-sum of the insertion losses obtained on both sides for the fiber optic links of FIGS. 3A-3C to remove the influence of the relative Rayleigh backscattering coefficients, in accordance with an example of the present disclosure. For example, FIG. 4 provides examples of half-sum determination, where the values 0->E and E->0 may be added and then divided by two.

Figure 2C:
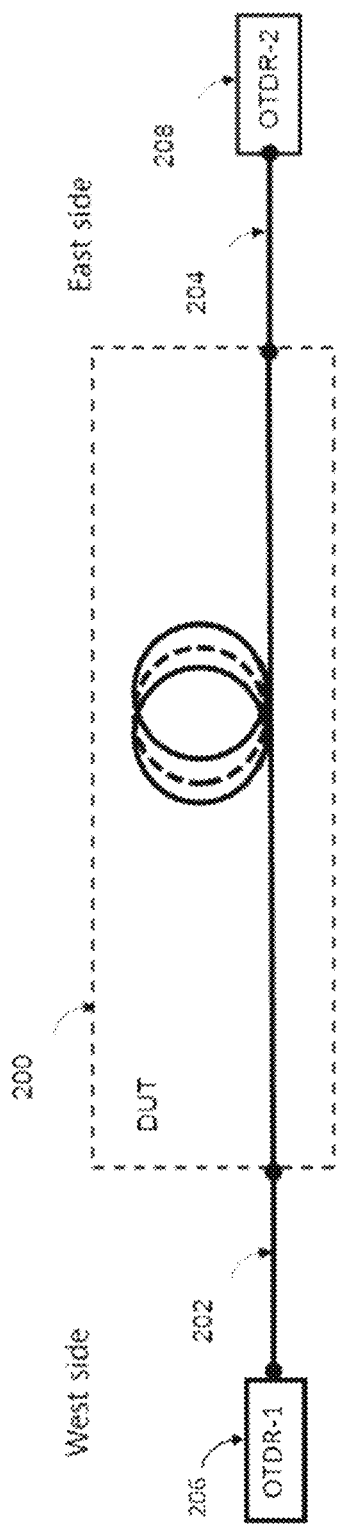
FIG. 2C illustrates automated bidirectional testing of the fiber optic link, in accordance with an example of the present disclosure.

In some bidirectional reflectometry techniques, such as the technique of FIGS. 2A and 2B, an OTDR, such as OTDR-1 may be connected to one end of a fiber optic link to perform a measurement in one direction, and the same OTDR may be disconnected and connected to an opposite end of the fiber optic link to perform a second measurement in an opposite direction. In other bidirectional reflectometry techniques as illustrated in FIG. 2C, which may be referred to as automated bidirectional reflectometry techniques, by pairing a local OTDR with a far end OTDR connected at the opposite end of the fiber optic link (e.g., or a fiber optic cable including the fiber optic link), communication between the two OTDRs will ensure identical test configurations, continuity of the fiber link, and easier acquisition and compilation of data. In this regard, the measurement time may also be reduced while ensuring the quality of the measurements and reducing the risk of errors. The automated functionality may be used to perform reflectometry tests at multiple wavelengths (e.g., to improve detection of fiber optic link bends), and include bidirectional attenuation and optical reflection loss (ORL) tests.

In other bidirectional OTDR reflectometry techniques, such as a "loop back" testing technique, rather than utilizing a second OTDR at the far end of the fiber optic link, a loopback cable may connect one fiber optic link to another fiber optic link which is also to be tested. In this way, an OTDR test pulse may be sent down one fiber optic link and continues through the loop back and down the second fiber optic link, thus testing both fibers uni-directionally at the same time. To gain the benefit of bidirectional OTDR testing, both fiber optic links (including the loop back) may then be tested in the opposite direction from the same location. This technique may use an OTDR approach such as where a single OTDR is moved from the first to the second fiber optic link to manually test in each direction and the results may be manually combined, or an automated OTDR approach where two OTDRs are used, one connected to each fiber optic link end to automatically test each direction and combine test results.

With respect to automated bidirectional testing of a fiber optic link, multipurpose OTDRs and testers may be configured for automated bidirectional reflectometry or other bidirectional fiber optic testing, at the push of a button. These devices may also include a built-in feature that allows them to generate reports for speed and convenience. For example, when making an automated bidirectional measurement on a fiber optic link, the test instruments (e.g., OTDRs) may need to exchange data to synchronize the measurement, exchange setup information, and exchange results. For example, as disclosed in commonly owned U.S. patent application Ser. No. 16/152,046, titled "OPTICAL TIME-DOMAIN REFLECTOMETER DEVICE INCLUDING MULTIPLE AND BI-DIRECTIONAL OPTICAL TESTING FOR FIBER ANALYSIS", the disclosure of which is incorporated by reference in its entirety, the OTDR devices may implement frequency modulation to exchange data. Each synchronization, events and measurement results may be encoded by a frequency. However, this process of sending and decoding data may include a plurality of sequences of data exchange. In this regard, it is technically challenging to further reduce a time needed to exchange data between two or more test instruments (e.g., OTDRs).

The apparatuses, methods, and non-transitory computer readable media disclosed herein address the aforementioned technical challenges by providing for relatively high test speeds, for example, for data transfers such as transfer of OTDR measurement point files, within a relatively short time duration. In this regard, the apparatuses, methods, and non-transitory computer readable media disclosed herein provide for high-performance communication based on the implementation of hardware and software functionality that is dedicated to the transfer of data. For example, the apparatuses, methods, and non-transitory computer readable media disclosed herein provide for utilization of an OTDR and the DUT (e.g., a fiber optic link) to exchange data without using another communication device, such as Ethernet, WiFi, Global System for Mobiles (GSM), or an optical transceiver using fibers other than the DUT. Thus, the apparatuses, methods, and non-transitory computer readable media disclosed herein provide for utilization of an OTDR and the DUT to exchange data, such as OTDR trace data, at relatively high speeds. The apparatuses, methods, and non-transitory computer readable media disclosed herein also provide for communication establishment to test the continuity of a fiber optic link.

For the apparatus, methods, and non-transitory computer readable media disclosed herein, the elements of the apparatus, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

Figure 1:
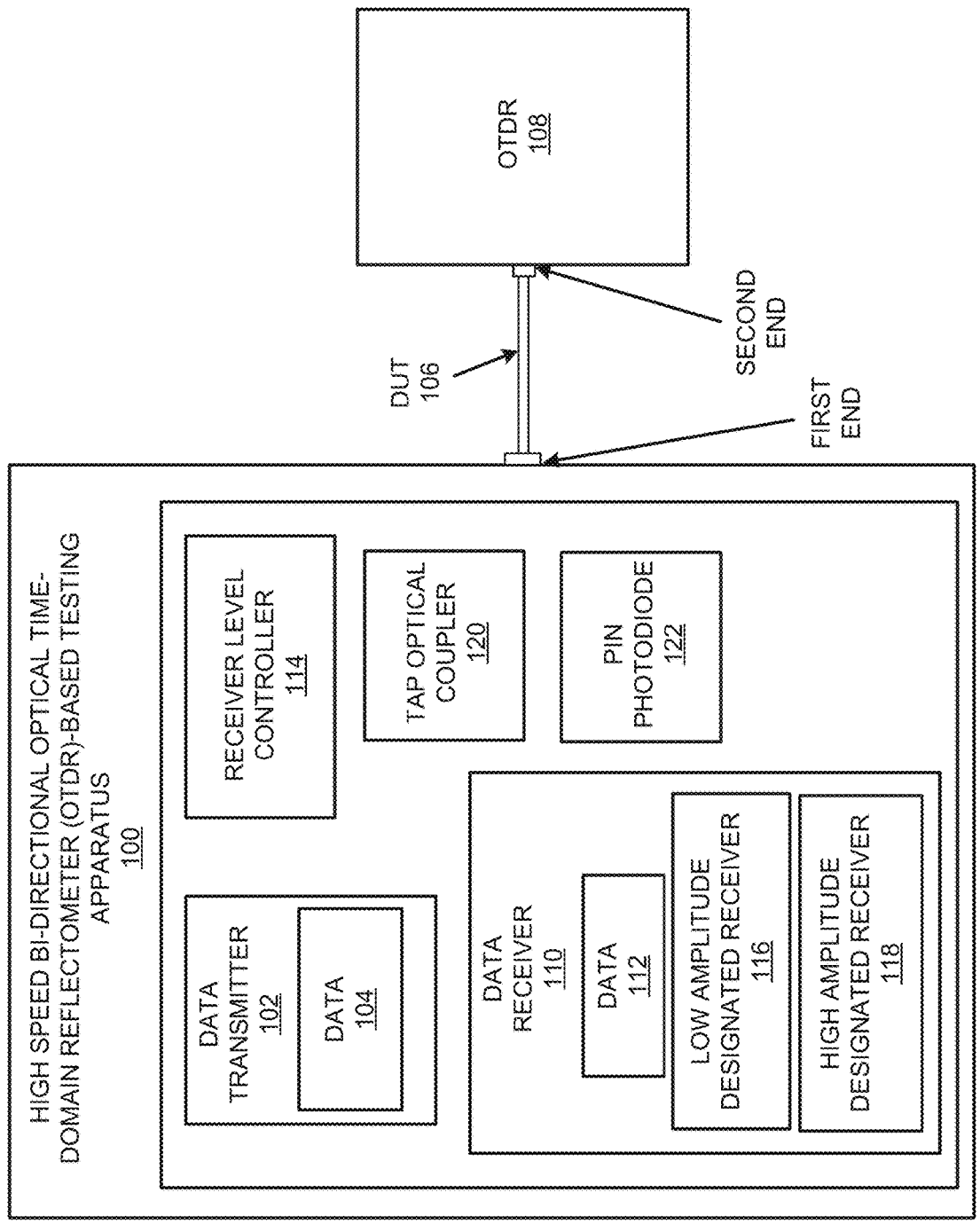
FIG. 1 illustrates an architectural layout of a high speed bidirectional optical time-domain reflectometer (OTDR)-based testing apparatus in accordance with an example of the present disclosure.

FIG. 1 illustrates an architectural layout of a high speed bidirectional OTDR-based testing apparatus (hereinafter also referred to as "apparatus 100") in accordance with an example of the present disclosure.

Referring to FIG. 1, the apparatus 100 may include a data transmitter 102 that is executed by at least one hardware processor (e.g., the hardware processor 902 of FIG. 9, and/or the hardware processor 1104 of FIG. 11), to transmit data 104 from a first end of a device under test (DUT) 106 towards an OTDR 108 that is operatively connected to a second opposite end of the DUT 106. As disclosed herein in further detail with reference to FIG. 5, the apparatus 100 may also be an OTDR. Further, the OTDR 108 may be another instantiation of the apparatus 100, and is designated apparatus 100' in FIG. 5.

A data receiver 110 that is executed by at least one hardware processor (e.g., the hardware processor 902 of FIG. 9, and/or the hardware processor 1104 of FIG. 11) may receive further data 112 that is transmitted by the OTDR 108 from the second opposite end of the DUT 106 towards the first end of the DUT 106.

According to examples disclosed herein, for the data receiver 110, a signal quantization function that converts a data signal into a data bit stream may be performed by a dedicated hardware component such as a comparator or a function programmed in an field-programmable gate array (FPGA).

Figure 5:
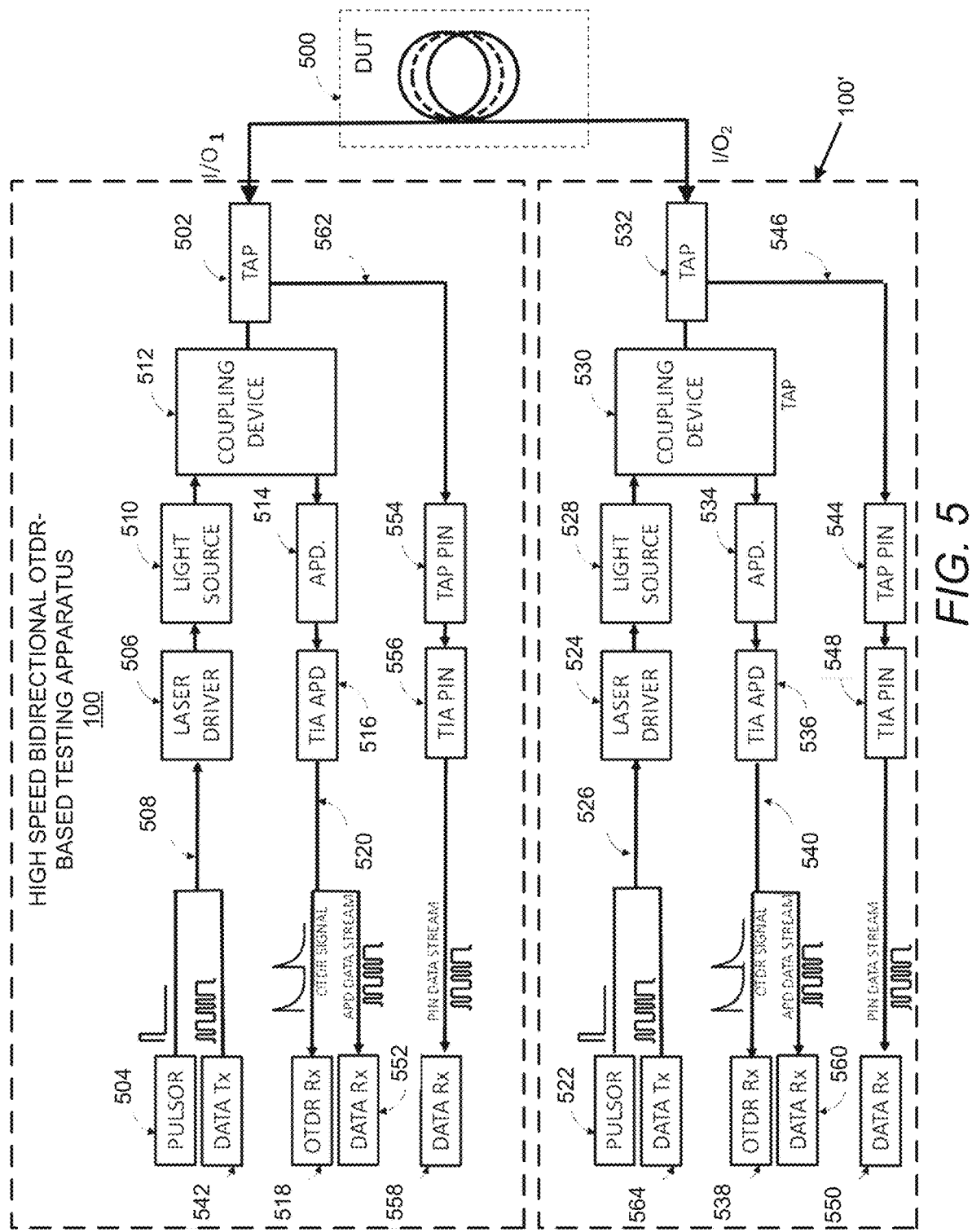
FIG. 5 illustrates utilization of a photodiode coupled to a fiber optic link to illustrate operation of the high speed bidirectional OTDR-based testing apparatus of FIG. 1, in accordance with an example of the present disclosure.

As disclosed herein in further detail with reference to FIG. 5, a receiver level controller 114 that is executed by at least one hardware processor (e.g., the hardware processor 902 of FIG. 9, and/or the hardware processor 1104 of FIG. 11) may adjust, based on an amplitude of the further data 112, a direction of receiving of the further data 112 towards a first receiver that includes a low amplitude designated receiver 116 (e.g., see avalanche photodiode 514 and transimpedance amplifier 516 of FIG. 5) of the data receiver 110 or towards a second receiver that includes a high amplitude designated receiver 118 (e.g., see tap PIN 554 photodiode and transimpedance PIN amplifier 556 of FIG. 5) of the data receiver 110.

According to examples disclosed herein, the DUT 106 may include a fiber optic link.

According to examples disclosed herein, as disclosed herein in further detail with reference to FIG. 5, the apparatus 100 may further include a tap optical coupler 120 to extract part of optical power received from the OTDR 108 connected to the second opposite end of the DUT 106.

According to examples disclosed herein, as disclosed herein in further detail with reference to FIG. 5, the apparatus 100 may further include a tap PIN photodiode 122 operatively connected to the tap optical coupler 120 to convert an optical data stream, which corresponds to the further data 112, in the electric domain. The conversion of the optical data stream in the electric domain may be implemented to process an electrical signal for conversion into data.

Figure 6:
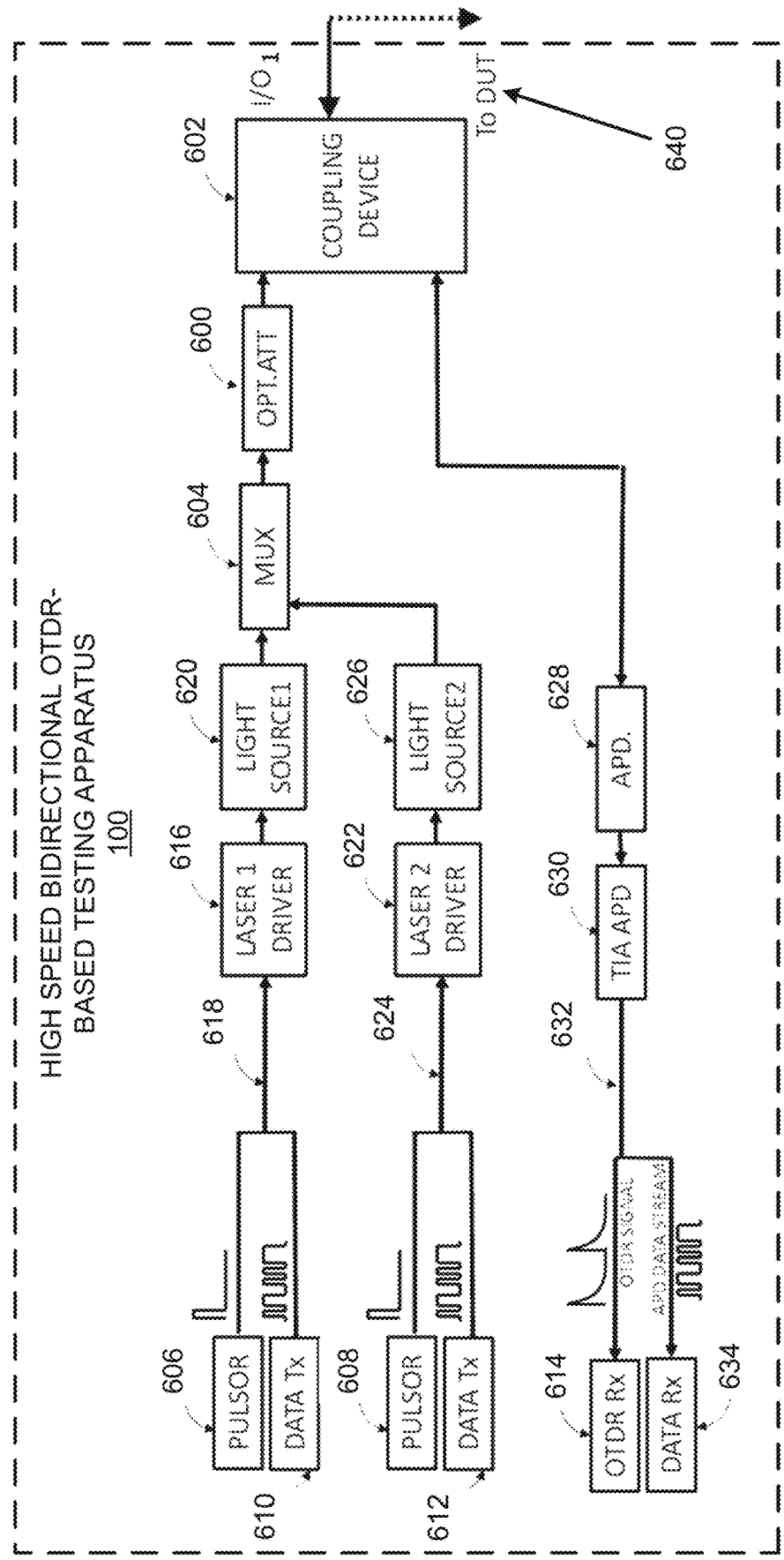
FIG. 6 illustrates a configuration based on attenuation of an emitted optical signal to illustrate operation of the high speed bidirectional OTDR-based testing apparatus of FIG. 1, in accordance with an example of the present disclosure.

According to examples disclosed herein with respect to FIGS. 5 and 6, instead of the tap optical coupler 120 and the PIN photodiode 122 of FIG. 5, as shown in FIG. 6, the apparatus 100 may include an optical attenuator to adjust a level of power of an optical source that transmits the data from the first end of the DUT towards the OTDR.

Figure 7:
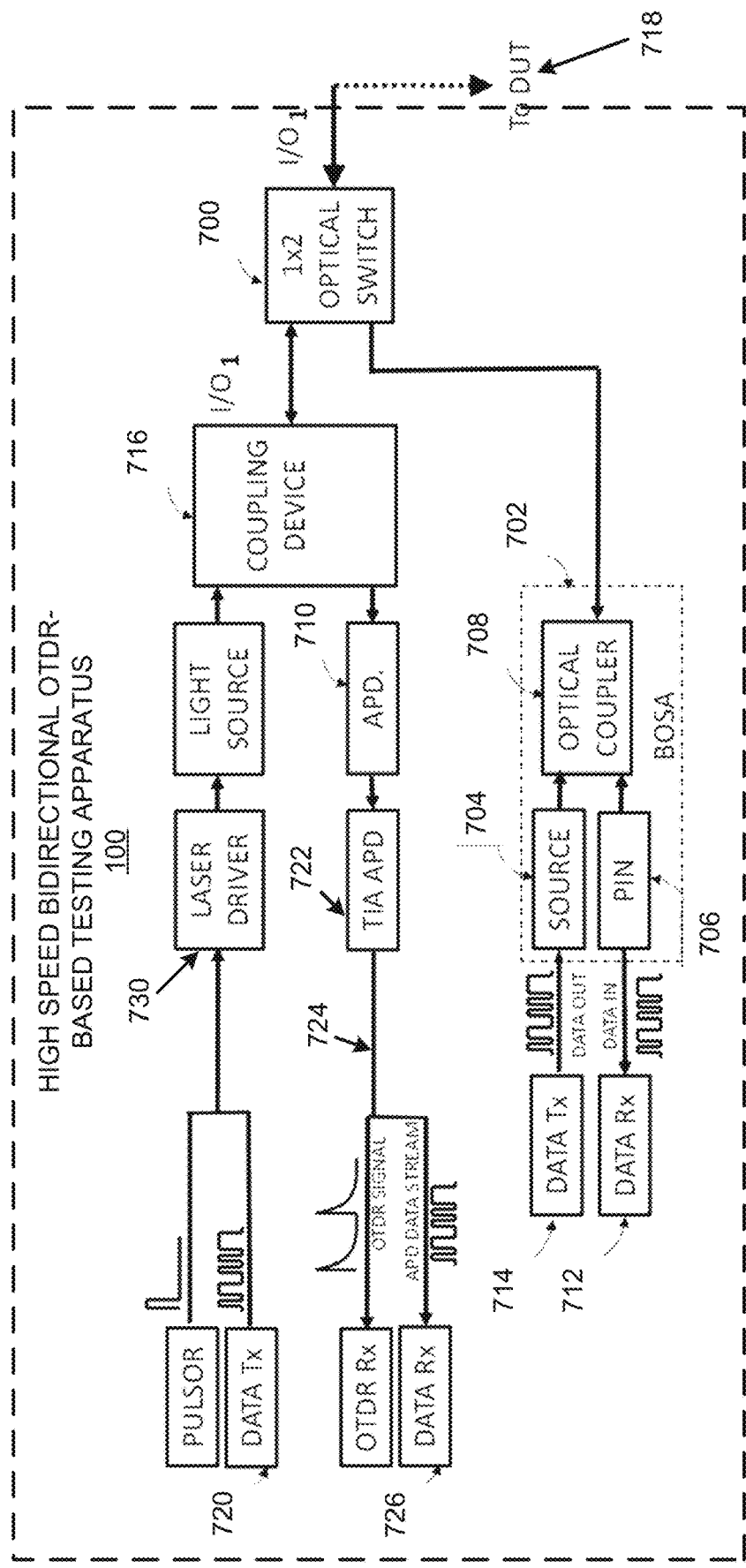
FIG. 7 illustrates utilization of an optical switch to illustrate operation of the high speed bidirectional OTDR-based testing apparatus of FIG. 1, in accordance with an example of the present disclosure.

According to examples disclosed herein with respect to FIGS. 1, 5, and 7, instead of the tap optical coupler 120 and the PIN photodiode 122 of FIG. 5, as shown in FIG. 7, the apparatus 100 may include an optical switch to switch, based on the received further data, between an input/output and a bidirectional optical sub-assemblies (BOSA)-based data receiver associated with the data receiver.

According to examples disclosed herein with respect to FIGS. 1, 5, and 6, the apparatus 100 may instead include an optical attenuator (e.g., see optical attenuator 600 of FIG. 6) to adjust a level of power of an optical source that transmits the data from the first end of the DUT towards the OTDR. In this regard, the apparatus 100 may include an avalanche photodiode (e.g., see avalanche photodiode 628 of FIG. 6) to receive the further data that is transmitted by the OTDR from the second opposite end of the DUT towards the first end of the DUT. Further, the apparatus 100 may include a transimpedance amplifier (e.g., see transimpedance amplifier 630 of FIG. 6) operatively connected to the avalanche photodiode to receive the further data that is transmitted by the OTDR from the second opposite end of the DUT towards the first end of the DUT.

Figure 8:
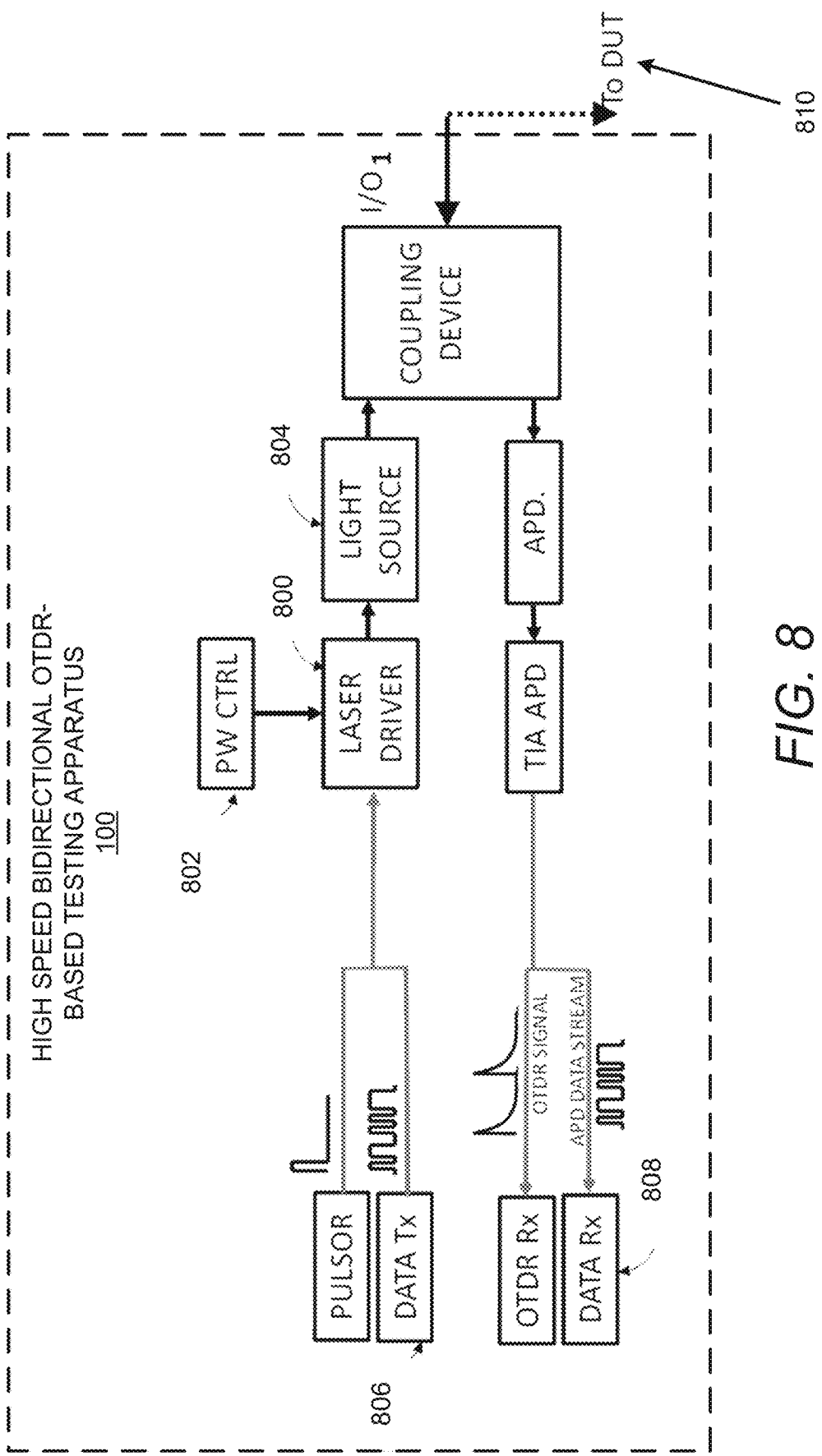
FIG. 8 illustrates a further alternative configuration of the high speed bidirectional OTDR-based testing apparatus of FIG. 1, in accordance with an example of the present disclosure.

According to examples disclosed herein with respect to FIGS. 5 and 8, instead of the tap optical coupler 120 and the PIN photodiode 122 of FIG. 5, as shown in FIG. 8, the apparatus 100 may include a laser current controller to adjust an output optical power of an optical source that is used to transmit the data. The laser current controller may utilize a laser driver and utilize a power control command to adjust the current of the laser driver.

Operation of the apparatus 100 is described in further detail with reference to FIGS. 5-8.

FIG. 5 illustrates utilization of a photodiode coupled to a fiber optic link to illustrate operation of the apparatus 100, in accordance with an example of the present disclosure.

Referring to FIG. 5, the apparatus 100 may include a photodiode coupled to a device under test (DUT) 500, such as a fiber optic link, dedicated to receiving a data stream. A tap optical coupler 502 (e.g., the tap optical coupler 120 of FIG. 1) may take part of the power from the line in which it is inserted. The tap optical coupler 502 may be used for optical power monitoring. Further, the tap optical coupler 502 may be associated with a PIN photodiode (junction composed of an intrinsic zone interposed between a heavily P-doped region and another heavily N-doped). The component integrating these two functions is then called PIN-TAP (or TAP PIN).

In an OTDR mode, the generator of an electrical test stimulus (e.g., PULSOR 504, which may represent an electrical pulse generator) may control a laser driver 506 via a link 508. The laser driver 506 may in turn generate an electrical stimulus adapted to an optical source 510 (e.g., light source). A round-trip coupling device 512 may transmit the signal to the DUT 500 via the tap optical coupler 502.

Still in the OTDR mode, the signal returned by the DUT 500 (Rayleigh backscatter and Fresnel reflection) may pass through the tap optical coupler 502, and then through the round-trip coupling device 512 to reach an avalanche photodiode (APD) 514. The photo-current from the avalanche photodiode 514 may then be directed to a transimpedance amplifier 516 connected to the reception stage of an OTDR receiver 518 via an electrical link 520.

A second instantiation of the apparatus 100 may be connected to the other end of the DUT 500, and designated as apparatus 100' as shown in FIG. 5. However, the components for the apparatus 100' (which are identical to the components of the apparatus 100) are labeled differently from the components of the apparatus 100 to facilitate a description of the operation of the apparatus 100.

For the apparatus 100', the generator of an electrical test stimulus (e.g., PULSOR 522) may control a laser driver 524 via a link 526. The laser driver 524 may in turn generate an electrical stimulus adapted to an optical source 528. A round-trip coupling device 530 may transmit the signal to the DUT 500 via a tap optical coupler 532.

Still in the OTDR mode, the signal returned by the DUT 500 (Rayleigh backscatter and Fresnel reflection) may pass through the tap optical coupler 532, and then through the round-trip coupling device 530 to reach an avalanche photodiode 534. The photo-current from the avalanche photodiode 534 may then be directed to a transimpedance amplifier 536 connected to the reception stage of an OTDR receiver 538 via an electrical link 540.

In the data transfer mode, the laser driver 506 does not receive a signal from the PULSOR 504, but instead receives a signal from a transceiver 542 (e.g., the data transmitter 102 of FIG. 1). The transceiver 542 may represent a software programmable hardware component that generates electrical data bit stream sent to the laser driver 506. Data may be sent on the DUT 500 through the round-trip coupling device 512 and the tap optical coupler 502. After transfer via the DUT 500, the data may be received on the avalanche photodiode 534 via the tap optical coupler 532 and the round-trip coupling device 530. The data may also be received on a tap PIN 544 photodiode via the tap optical coupler 532. Due to its sensitivity, the avalanche photodiode 534 channel may be reserved for the reception of low power signals, while the tap PIN 544 photodiode channel may be used to avoid reception saturation linked to high amplitude signals received from the DUT 500. With respect to a low power signal versus a high amplitude signal, an OTDR may emit optical power which may be approximately 0 dBm. The insertion loss between distant OTDRs may be up to 40 or 45 dB, and thus the optical power received by an OTDR may vary between 0 and −45 dBm. Due to the wide variation of this received power, the avalanche photodiode 514 may not be usable for the entire power range. In this regard, the tap PIN 554 photodiode may be utilized when input power is higher than −20 dBm, and for lower power, the avalanche photodiode 514 may be utilized. In this regard, the avalanche photodiode 514 may represent a high sensitivity component for which output level is saturated when input power is too high, where the input power may be considered too high when data cannot be recovered after detection of this power by the avalanche photodiode 514. In such a case, the tap PIN 554 photodiode may be utilized due to its higher optical power saturation level, which may represent a state when input power is higher than −20 dBm.

In the case of strong (e.g., high amplitude) signals received from the DUT 500, part of the signals may be picked up by the tap optical coupler 532 and sent to the tap PIN 544 photodiode via a link 546. A transimpedance PIN (TIA PIN) amplifier 548 may receive the photo-current from the tap PIN 544 photodiode. The output of the transimpedance PIN amplifier 548 may be connected to a data receiver reception stage 550 dedicated to the data signal.

The symmetrical diagram and the data transfer operation (e.g., from apparatus 100' to apparatus 100) may be identical for the reception chain avalanche photodiode 514, transimpedance amplifier 516, electrical link 520 and data receiver 552 (e.g., the high amplitude designated receiver 118 of FIG. 1), as well as for the reception chain tap PIN 554 photodiode (e.g., the PIN photodiode 122 of FIG. 1), transimpedance PIN amplifier 556, and data receiver 558 (e.g., the low amplitude designated receiver 116 of FIG. 1). For the example of FIG. 5, the data receiver 110 of FIG. 1 may include the data receiver 552 and the data receiver 558. Optical data may be received by the avalanche photodiode 514 which converts the signal in electrical photocurrent. The transimpedance amplifier 516 may amplify and convert this current into a voltage signal. This signal may then be processed by the data receiver 552 to obtain data. The data receivers 552 and 558 may include a dedicated hardware component such as a quantizer or analog comparator which compares a signal with a threshold, and may further include a software programmable hardware component that is programmed to receive data. Further, in the data transfer mode, the laser driver 524 does not receive the signal from the PULSOR 522, but instead receives the signal from a transceiver 564. In the case of strong (e.g., high amplitude) signals received from the DUT 500, part of the signals may be picked up by the tap optical coupler 502 and sent to the tap PIN 554 photodiode via a link 562.

The example of FIG. 5 may utilize dedicated data receivers (e.g., 550, 558, 552 and 560), as well as dedicated data transmitters in order to optimize the performance with respect to digital data exchange between the OTDR instruments (e.g., the apparatus 100 and the apparatus 100') located on either side of the DUT 500.

FIG. 6 illustrates a configuration based on attenuation of an emitted optical signal to illustrate operation of the apparatus 100, in accordance with an example of the present disclosure.

The configuration of FIG. 6 may represent the case of a multi-wavelength system (in this case two) in order to illustrate that the optical attenuator is not dedicated to a single source. Thus, an optical attenuator 600 may be inserted between a round-trip coupling device 602 (e.g., optical coupler) and a wavelength multiplexer 604 (MUX). The operation of the transmission and reception chains, which implement the pulsors (606 and 608), the data transmitters (610 and 612), the OTDR receiver 614 as well as the receivers dedicated to the exchanges of digital data remains identical to corresponding components of FIG. 5. Further, compared to the example of FIG. 5, use of the optical attenuator 600 provides for lowering of the optical power, avoiding saturation of avalanche photodiode 628 and removal of components 558, 556, 554 and 502 of FIG. 5.

To facilitate an understanding of FIG. 6, only one of the two apparatus (e.g., similar to apparatus 100 or apparatus 100') connected on either side of the DUT 640 is shown in FIG. 6. However, in a similar manner as FIG. 5, an apparatus 100 that includes all of the components of FIG. 6, and a second apparatus 100' may be connected to an opposite end of the DUT 640. The detection sensitivity may be adjusted by attenuating the signal emitted using the optical attenuator 600. When the reception chain and in particular the avalanche photodiode 534 of the remote OTDR (e.g., similar to the apparatus 100' (not shown) on the other side of the DUT 640) risks being saturated, the optical attenuator 600 may reduce the optical power emitted, and thereby the optical power received at the other end of the DUT 640. This operation may require prior communication between the OTDRs located on either side of the DUT 640 to communicate the saturation state of the avalanche photodiode reception chain. With respect to determination of saturation, in the presence of photocurrent received by transimpedance amplifier 630, the saturation may be detected as the signal crosses a predefined saturation level threshold or it is not possible to decode data. Saturation may represent a condition when input optical power is too high so that this variation of optical power is not converted linearly into variation of electrical output current. Thus, by managing the level of optical power, the configuration of FIG. 6 may be implemented by utilizing hardware and software functions dedicated to data transmission on the DUT 640 and a sensitivity optimization system. With respect to sensitivity optimization, the optimization may be based on reaching an optical power detected by avalanche photodiode 628 by adjusting the optical attenuator 600 of the remote OTDR on the other side of the DUT 640.

With continued reference to FIG. 6, in a similar manner as the configuration of FIG. 5, in an OTDR mode, the generator of an electrical test stimulus (e.g., PULSOR 606) may control a laser driver 616 via a link 618. The laser driver 616 may in turn generate an electrical stimulus adapted to an optical source 620 (e.g., light source).

Similarly, the generator of an electrical test stimulus (e.g., PULSOR 608) may control a laser driver 622 via a link 624. The laser driver 622 may in turn generate an electrical stimulus adapted to an optical source 626 (e.g., light source). The wavelength multiplexer 604 may represent a passive optical device that combines the optical signals from the optical source 620 and the optical source 626 according to their wavelengths.

Still in the OTDR mode, the photo-current from an avalanche photodiode 628 may be directed to a transimpedance amplifier 630 connected to the reception stage of the OTDR receiver 614 via an electrical link 632. Further, the operation of data receiver 634 may be similar to that for data receiver 552 of FIG. 5.

FIG. 7 illustrates utilization of an optical switch to illustrate operation of the apparatus 100, in accordance with an example of the present disclosure.

Referring to FIG. 7, compared to the configuration of FIG. 5, an optical switch 700 may be utilized to place the apparatus 100 in receiver mode on a dedicated channel using BOSA 702 (Bidirectional Optical Sub-Assemblies) technology. The BOSA 702 may combine the source 704, receiver 706 and optical coupler 708 devices.

Management of the reception sensitivity may be performed by arbitrating the selection of the reception channel according to the sensitivity, either via the avalanche photodiode 710 or via the use of the optical switch 700, and the transmission reception system using the BOSA 702 and data receiver 712. With respect to management of reception sensitivity, the branch with the BOSA 702 may be used by default, but when input optical power on the BOSA 702 is too low so that a signal is not detected, a switch is made to the other branch and the optical power will be detected by avalanche photodiode 710 which has higher sensitivity. The combination of the BOSA 702 and data transmit and receive systems (respectively 714 and 712) may implement a transceiver function for data transmission.

In a similar manner as disclosed herein with respect to FIG. 5, in an OTDR mode, a round-trip coupling device 716 may transmit a signal to the DUT 718 via the optical switch 700. In the data transfer mode, data may be sent on the DUT 718 through the round-trip coupling device 716 and the optical switch 700. In the data transfer mode, the laser driver 730 does not receive a signal from the PULSOR, but instead receives a signal from a transceiver 720. Further, as disclosed herein with respect to FIG. 5, the data transfer operation may be identical for the avalanche photodiode 710, transimpedance amplifier 722, electrical link 724, and data receiver 726.

With reference to FIGS. 5 and 7, for the OTDR and the data transfer modes for FIG. 7, in a first mode that is similar to FIG. 5, a data signal may be sent with the transceiver 720 and received by the avalanche photodiode 710 of the remote OTDR, and converted into data Rx. In a second mode that uses the BOSA 702, the transceiver 714 may send a data signal using source 704 of BOSA 702 of a first OTDR (e.g., apparatus 100 in a similar manner as in FIG. 5), and a second remote OTDR (e.g., apparatus 100' in a similar manner as in FIG. 5) may receive a signal by its receiver (e.g., PIN photodiode) that is similar to receiver 706, of its BOSA that is similar to BOSA 702.

FIG. 8 illustrates a further alternative configuration of the apparatus 100, in accordance with an example of the present disclosure.

Compared to the configuration of FIG. 5, the configuration of FIG. 8 may implement a laser driver 800 integrating the possibility of attenuating the laser current continuously or in steps. In this regard, a laser current controller 802 may reduce the optical power of the optical source 804. As with the examples of FIGS. 5-7, the example of FIG. 8 may combine the use of hardware (e.g., transceiver 806, data receiver 808, etc.), and software functions dedicated to data transmission on the DUT 810 and a receiver sensitivity optimization system controlling the level of power of the source. When the reception chain and in particular the avalanche photodiode of the remote OTDR risks being saturated, the laser current controller 802 may be used to reduce the optical power emitted, and thereby the optical power received at the other end of the DUT 810 by the distant OTDR. This operation may utilize prior communication between the OTDRs located on either side of the DUT 810 to communicate the saturation state of the avalanche photodiode reception chain. The optical power control of the source may need to use a source with a monitor photo diode or may need to add a PIN-TAP to measure the optical power sent to the line.

Figure 9:
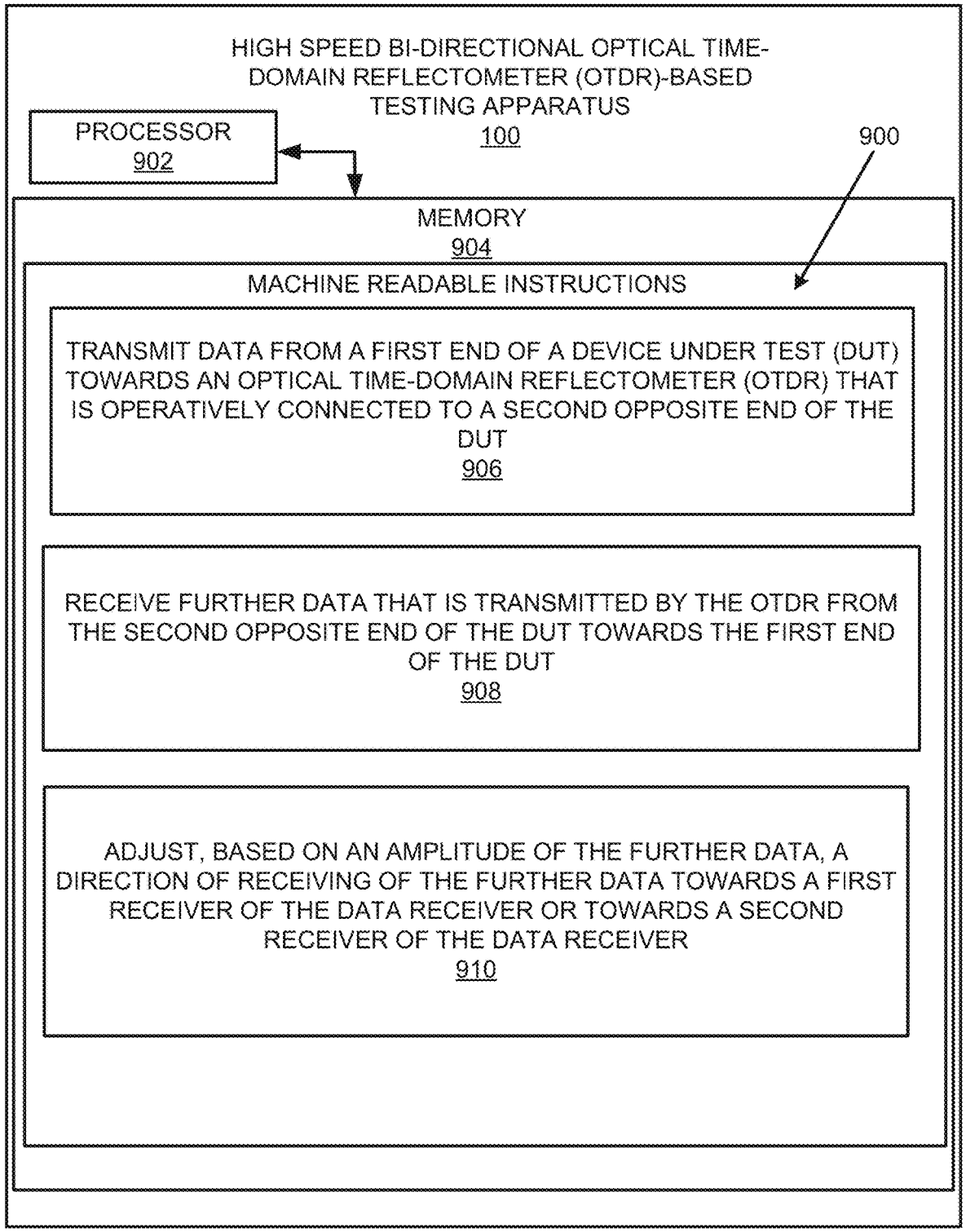
FIG. 9 illustrates an example block diagram for high speed bidirectional OTDR-based testing in accordance with an example of the present disclosure.
Figure 11:
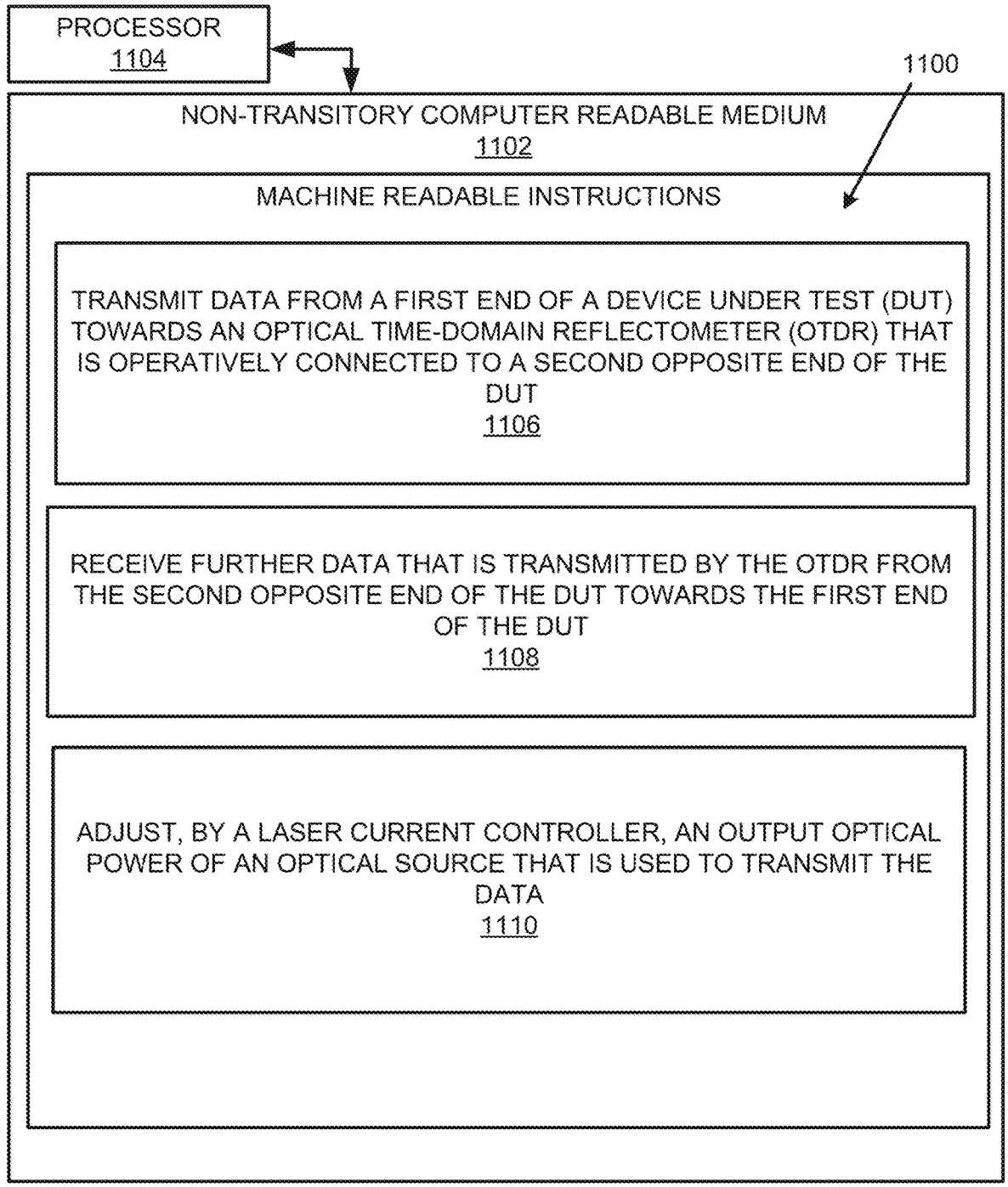
FIG. 11 illustrates a further example block diagram for high speed bidirectional OTDR-based testing in accordance with another example of the present disclosure.

FIGS. 9-11 respectively illustrate an example block diagram 900, a flowchart of an example method 1000, and a further example block diagram 1100 for high speed bidirectional OTDR-based testing, according to examples. The block diagram 900, the method 1000, and the block diagram 1100 may be implemented on the apparatus 00 described above with reference to FIG. 1 by way of example and not of limitation. The block diagram 900, the method 1000, and the block diagram 1100 may be practiced in other apparatuses. In addition to showing the block diagram 900, FIG. 9 shows hardware of the apparatus 00 that may execute the instructions of the block diagram 900. The hardware may include a processor 902, and a memory 904 storing machine readable instructions that when executed by the processor cause the processor to perform the instructions of the block diagram 900. The memory 904 may represent a non-transitory computer readable medium. FIG. 10 may represent an example method for high speed bidirectional OTDR-based testing, and the steps of the method. FIG. 11 may represent a non-transitory computer readable medium 1102 having stored thereon machine readable instructions to provide high speed bidirectional OTDR-based testing according to an example. The machine readable instructions, when executed, cause a processor 1104 to perform the instructions of the block diagram 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for a processor may reside during runtime.

Referring to FIGS. 1-9, and particularly to FIG. 5 and the block diagram 900 shown in FIG. 9, the memory 904 may include instructions 906 to transmit data from a first end of a device under test (DUT) towards an optical time-domain reflectometer (OTDR) that is operatively connected to a second opposite end of the DUT.

The processor 902 may fetch, decode, and execute the instructions 908 to receive further data that is transmitted by the OTDR from the second opposite end of the DUT towards the first end of the DUT.

The processor 902 may fetch, decode, and execute the instructions 910 to adjust, based on an amplitude of the further data, a direction of receiving of the further data towards a first receiver of the data receiver or towards a second receiver of the data receiver.

Referring to FIGS. 1-8 and 10, and particularly FIGS. 7 and 10, for the method 1000, at block 1002, the method may include transmitting, by at least one hardware processor, data from a first end of a device under test (DUT) towards an optical time-domain reflectometer (OTDR) that is operatively connected to a second opposite end of the DUT.

At block 1004, the method may include receiving, by the at least one hardware processor, further data that is transmitted by the OTDR from the second opposite end of the DUT towards the first end of the DUT.

At block 1006, the method may include switching, by an optical switch 700, based on the received further data, between an input/output (e.g., round-trip coupling device 716) and a bidirectional optical sub-assemblies (BOSA)-based data receiver 702 associated with the data receiver.

According to examples disclosed herein, the method may include switching, by the optical switch, based on an optical power associated with the received further data, between the input/output and the BOSA-based data receiver associated with the data receiver.

According to examples disclosed herein, the method may include switching, by the optical switch, based on a relatively low optical power associated with the received further data, to the input/output data receiver that includes an avalanche photodiode.

According to examples disclosed herein, the method may include switching, by the optical switch, based on a relatively high optical power associated with the received further data, to the BOSA-based data receiver.

Referring to FIGS. 1-8 and 11, and particularly FIGS. 8 and 11, for the block diagram 1100, the non-transitory computer readable medium 1102 may include instructions 1106 to transmit data from a first end of a device under test (DUT) towards an optical time-domain reflectometer (OTDR) that is operatively connected to a second opposite end of the DUT.

The processor 1104 may fetch, decode, and execute the instructions 1108 to receive further data that is transmitted by the OTDR from the second opposite end of the DUT towards the first end of the DUT.

The processor 1104 may fetch, decode, and execute the instructions 1110 to adjust, by a laser current controller (e.g., laser current controller 802), an output optical power of an optical source that is used to transmit the data.

According to examples disclosed herein, the processor 1104 may fetch, decode, and execute the instructions to receive, by an avalanche photodiode (e.g., see "APD" of FIG. 8), the further data that is transmitted by the OTDR from the second opposite end of the DUT towards the first end of the DUT.

According to examples disclosed herein, the processor 1104 may fetch, decode, and execute the instructions to receive, by a transimpedance amplifier (e.g., see "TIAAPD" of FIG. 8) operatively connected to the avalanche photodiode, the further data that is transmitted by the OTDR from the second opposite end of the DUT towards the first end of the DUT.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
 a data transmitter, executed by at least one hardware processor, to
   transmit data from a first end of a device under test (DUT) towards an optical time-domain reflectometer (OTDR) that is operatively connected to a second opposite end of the DUT;
 a data receiver, executed by the at least one hardware processor, to
   receive further data that is transmitted by the OTDR from the second opposite end of the DUT towards the first end of the DUT; and
 a receiver level controller, executed by the at least one hardware processor, to
   adjust, based on an amplitude of the further data, a direction of receiving of the further data towards a first receiver of the data receiver or towards a second receiver of the data receiver.

2. The apparatus according to claim 1, wherein the DUT includes a fiber optic link.

3. The apparatus according to claim 1, wherein the receiver level controller includes a tap optical coupler to extract part of optical power received from the OTDR connected to the second opposite end of the DUT.

4. The apparatus according to claim 3, further comprising:
 a tap PIN photodiode operatively connected to the tap optical coupler to convert an optical data stream, which corresponds to the further data, in an electric domain.

5. The apparatus according to claim 1, wherein the receiver level controller is executed by the at least one hardware processor to adjust, based on the amplitude of the further data, the direction of receiving of the further data towards the first receiver of the data receiver or towards the second receiver of the data receiver by:
 adjusting, based on the amplitude of the further data, the direction of receiving of the further data towards the first receiver that includes a low amplitude designated receiver or towards the second receiver that includes a high amplitude designated receiver.

6. The apparatus according to claim 5, wherein the receiver level controller is executed by the at least one hardware processor to adjust, based on the amplitude of the further data, the direction of receiving of the further data towards the first receiver that includes the low amplitude designated receiver by:
 adjusting, based on the amplitude of the further data, the direction of receiving of the further data towards the low amplitude designated receiver that includes an avalanche photodiode.

7. The apparatus according to claim 6, wherein the receiver level controller is executed by the at least one hardware processor to adjust, based on the amplitude of the further data, the direction of receiving of the further data towards the first receiver that includes the low amplitude designated receiver by:
 adjusting, based on the amplitude of the further data, the direction of receiving of the further data towards the low amplitude designated receiver that includes a transimpedance amplifier operatively connected to the avalanche photodiode.

8. The apparatus according to claim 5, wherein the receiver level controller is executed by the at least one hardware processor to adjust, based on the amplitude of the further data, the direction of receiving of the further data towards the second receiver that includes the high amplitude designated receiver by:
 adjusting, based on the amplitude of the further data, the direction of receiving of the further data towards the high amplitude designated receiver that includes a tap PIN photodiode.

9. The apparatus according to claim 8, wherein the receiver level controller is executed by the at least one hardware processor to adjust, based on the amplitude of the further data, the direction of receiving of the further data towards the second receiver that includes the high amplitude designated receiver by:
 adjusting, based on the amplitude of the further data, the direction of receiving of the thither data towards the high amplitude designated receiver that includes a transimpedanee PIN amplifier operatively connected to the tap PIN photodiode.

* * * * *